United States Patent [19]

Rado

[11] 4,283,371

[45] Aug. 11, 1981

[54] PROCESS FOR THE PRODUCTION OF ALUMINUM CHLORIDE AND RELATED PRODUCTS

[75] Inventor: Theodore A. Rado, Oklahoma City, Okla.

[73] Assignee: Kerr-McGee Corporation, Oklahoma City, Okla.

[21] Appl. No.: 116,302

[22] Filed: Jan. 28, 1980

[51] Int. Cl.³ .................................................. C01F 7/62
[52] U.S. Cl. ...................................... 423/126; 55/71; 55/72; 423/132; 423/135; 423/136; 423/137; 423/343; 423/495; 423/76; 423/79
[58] Field of Search ................ 423/126, 132, 135–137, 423/149, 343, 492, 495, 76, 79; 55/71, 72

[56] References Cited

U.S. PATENT DOCUMENTS

| | | |
|---|---|---|
| 2,245,358 | 6/1941 | Pechukas .............................. 423/149 |
| 2,533,021 | 12/1950 | Krchma ................................ 423/149 |
| 2,675,890 | 4/1954 | Frey et al. . |
| 2,836,547 | 5/1958 | Stoddard et al. . |
| 2,940,827 | 6/1960 | Groves . |
| 2,977,292 | 3/1961 | Ellsworth . |
| 3,066,010 | 11/1962 | Horning et al. . |
| 3,114,611 | 12/1963 | Ross . |
| 3,218,122 | 11/1965 | Nelson et al. . |
| 3,388,993 | 6/1968 | Peterson et al. . |
| 3,786,135 | 1/1974 | King et al. . |
| 3,793,003 | 2/1974 | Othmer ................................ 423/149 |
| 3,906,077 | 9/1975 | Rado et al. .......................... 423/149 |
| 3,938,969 | 2/1976 | Sebenik et al. ..................... 423/495 |
| 4,035,169 | 7/1977 | Sebenik et al. ..................... 423/495 |
| 4,066,424 | 1/1978 | Lippman et al. ................... 423/495 |
| 4,070,448 | 1/1978 | Jacobs et al. ....................... 423/495 |
| 4,083,923 | 4/1978 | Lippman et al. ................... 423/495 |
| 4,083,926 | 4/1978 | Ballain et al. ...................... 423/136 |
| 4,159,310 | 6/1979 | Reynolds et al. .................. 423/136 |

Primary Examiner—Herbert T. Carter
Attorney, Agent, or Firm—William G. Addison

[57] ABSTRACT

A continuous process for recovering substantially pure aluminum chloride from chlorination products of aluminum ore. The chlorination products are contacted with a first selective solvent to dissolve a substantial portion of the aluminum chloride and some ferric chloride. The solvent is separated from the chlorides which then are treated to produce a ferric chloride-rich stream and an aluminum chloride-rich stream in which the aluminum chloride to ferric chloride ratio is higher than the ratio prior to solvent separation. The aluminum chloride-rich stream is contacted with a second solvent to dissolve any ferric chloride present and saturate the solution with aluminum chloride. Aluminum chloride in excess of that soluble in the second solvent separates as a substantially pure solid phase. The solution is separated from solid phase and recycled in process to recover additional aluminum chloride.

6 Claims, 1 Drawing Figure

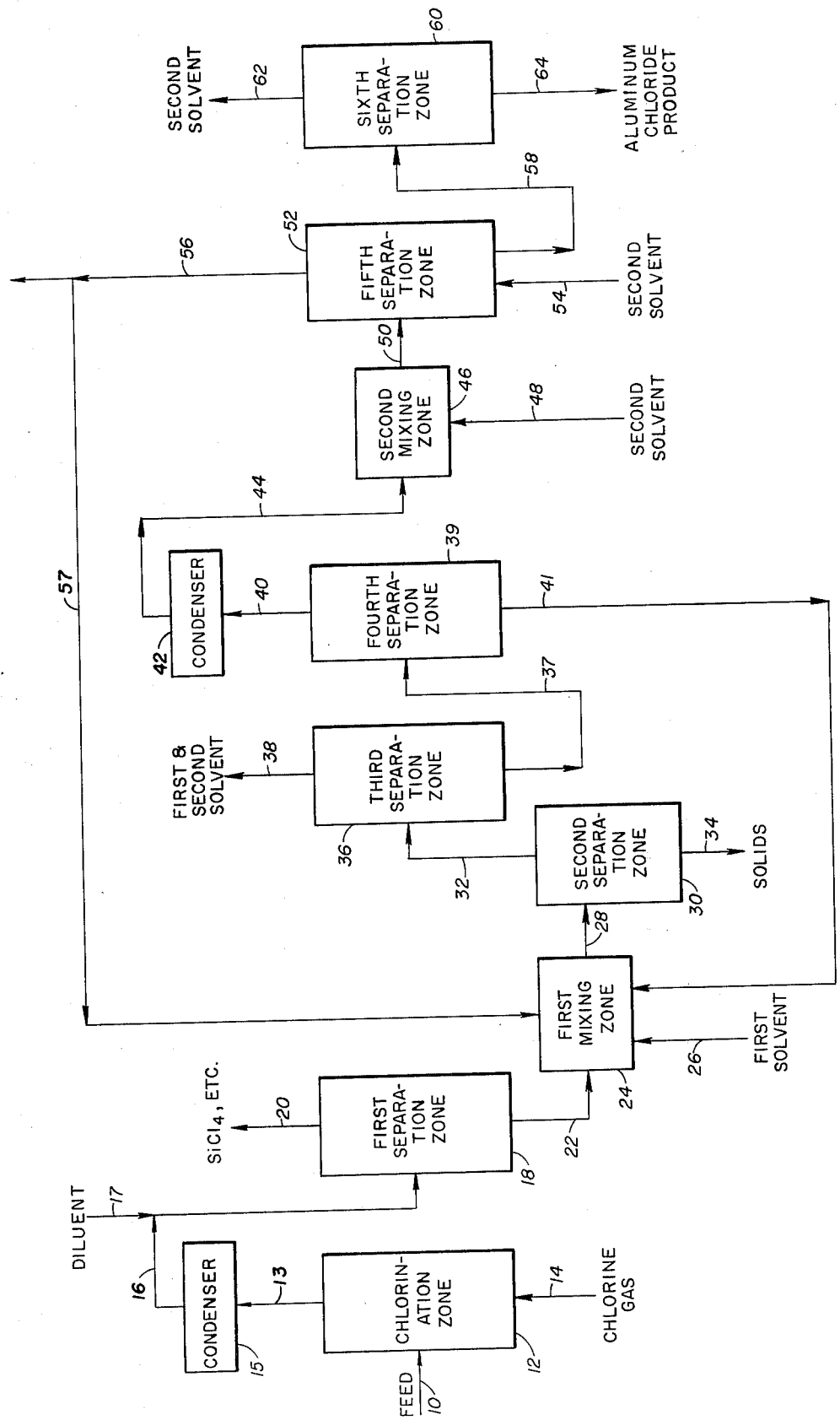

PROCESS FOR THE PRODUCTION OF ALUMINUM CHLORIDE AND RELATED PRODUCTS

BACKGROUND OF THE INVENTION

1. Field of the Invention

This invention relates to a process for the separation and recovery of substantially pure aluminum chloride from mixtures containing ferric chloride and other chlorinated impurities.

2. Description of the Prior Art

Aluminum chloride is an important chemical which has many industrial applications. For example, it is used as a catalyst in organic chemical syntheses and as a nucleating agent for titanium dioxide pigments. In addition, recent technological developments indicate the need for large tonages of aluminum chloride for the production of aluminum metal.

Current domestic production of aluminum chloride is carried out almost exclusively through direct chlorination of metallic aluminum of sufficient purity that purification of the aluminum chloride is unnecessary. However, methods for production of aluminum chloride which employ aluminum metal obviously would not be of use in processes for the production of aluminum. A more economical method of producing aluminum chloride from chlorination of an aluminous material is required.

Various methods have been suggested for the production of substantially pure aluminum chloride. In U.S. Pat. No. 3,786,135 there is disclosed a process for recovering aluminum chloride from the chlorination products of sodium contaminated alumina. That method is effected by cooling the gaseous chlorination products to a temperature below the chlorination reaction temperature but above the ambient condition condensation temperature of aluminum chloride. A substantial portion of the condensable constituents other than aluminum chloride are thereby separated from the gaseous products. The gaseous products are separated from the condensed material and then are cooled to a lower temperature which still is above the ambient condition condensation temperature of the aluminum chloride to condense additional material. The condensed material is again separated and the remaining essentially contaminant-free gaseous products are introduced into a fluidized bed of aluminum chloride. The gaseous products are cooled to a temperature substantially below the condensation temperature of aluminum chloride to cause direct sublimation of the aluminum chloride.

The disadvantage of this process is that the sodium contaminated alumina must be substantially free of iron, titanium and silicon impurities to achieve production of high purity aluminum chloride. Otherwise, the iron is present as a ferric chloride-aluminum chloride dimer in the gaseous products along with titanium chloride and silicon chloride which condenses with the aluminum chloride.

In U.S. Pat. No. 3,938,969 a method to overcome the disadvantages of condensation processes is presented. In accordance with that process, the aluminum chloride vapor selectively is dissolved from the chlorination product gases leaving the chlorinator. This is accomplished by a scrubbing solvent at atmospheric pressure. The aluminum chloride then is separated from the solvent by distillation at a pressure sufficient to condense the aluminum chloride as a liquid.

U.S. Pat. No. 4,070,448 discloses an improvement in the process of U.S. Pat. No. 3,938,969 to control the particle size of the sublimed aluminum chloride and minimize chloride losses. The chlorination products including aluminum chloride vapors are introduced into a first fluidized bed at an entrance velocity of 18 to 90 meters per second. The fluidized bed comprises aluminum chloride which has a particle size of from 1–500 microns and is maintained at a temperature of about 80° C. to 110° C. The uncondensed gas is removed from the first fluidized bed and introduced into a second fluidized bed at a velocity of 18–90 meters per second. The second bed comprises aluminum chloride similar to the first bed. The temperature is maintained in a range of from about 20° C. to 50° C. to condense the remainder of the chloride values from the gas.

U.S. Pat. No. 4,083,923 discloses a process for producing metallurgically pure aluminum chloride. An iron-containing aluminous ore is chlorinated at temperatures up to about 1000° C. to produce a mixed chloride gas stream. The gas stream is contacted with a liquid metal chloride solvent in an absorption column to preferentially absorb aluminum and iron chlorides. The aluminum chloride and iron chloride condense in the column and are dissolved by the solvent. The solvent mixture is withdrawn from the absorption column and introduced into a distillation vessel maintained at an elevated pressure to distill the aluminum chloride and iron chloride. The aluminum chloride and iron chloride vapors then are introduced into a rectification column operated at 3 to 4 atmospheres. The aluminum chloride is partially purified by the rectification. The aluminum chloride product stream is withdrawn from the rectification column and bubbled through a bath of molten aluminum metal to remove the remaining impurities.

Other processes for the purification of aluminum chloride or other metal chlorides are disclosed in, for example: U.S. Pat. No. 2,245,358; U.S. Pat. No. 2,311,466; U.S. Pat. No. 2,533,021; U.S. Pat. No. 2,675,890; U.S. Pat. No. 2,836,547; U.S. Pat. No. 2,940,827; U.S. Pat. No. 2,977,292; U.S. Pat. No. 3,066,010; U.S. Pat. No. 3,114,611; U.S. Pat. No. 3,218,122; U.S. Pat. No. 3,388,993; U.S. Pat. No. 3,793,003; U.S. Pat. No. 3,906,077; U.S. Pat. No. 4,035,169; U.S. Pat. No. 4,083,926; U.S. Pat. No. 4,066,424 and U.S. Pat. No. 4,159,310.

Numerous of the above processes depend upon fractional condensation or distillation to purify and separate the aluminum chloride from admixture with ferric chloride. However, aluminum chloride and ferric chloride exhibit mutual solid state solubility and in the vapor state mixed dimer molecules are present. Thus, many of the processes fail to produce an aluminum chloride product of sufficient purity for use in electrolytic processes for the production of aluminum metal.

SUMMARY OF THE INVENTION

Broadly, the present method provides a continuous process for recovering substantially pure aluminum chloride from the chlorination products of an aluminous ore containing iron and other impurities. The chlorination products are contacted with a first solvent maintained at a predetermined temperature and pressure to dissolve at least a portion, and preferably all, of the aluminum chloride which is contained in the chlorination products. The first solvent also may dissolve a portion of the ferric chloride present in the feed. The ferric chloride and other chlorides in excess of their solubility in the solvent, together with any insoluble matter, remain in suspension in the solvent solution. Volatile impurities, such as for example silicon tetrachloride, can be removed from the chlorination products prior to contacting with the solvent. The mixture then is introduced into a separation zone.

In the separation zone, insolubles are separated to provide a substantially solids-free solution. The solution will contain aluminum chloride and ferric chloride in a ratio essentially in proportion to their respective solubilities in the solvent. The first solvent then is separated from the solution and the remainder, comprising a molten aluminum chloride mixture, is treated to produce an aluminum chloride-rich stream in which the ratio of aluminum chloride to ferric chloride is higher than the ratio present in the solution prior to solvent separation and a second stream in which the ratio of aluminum chloride to ferric chloride is lower.

The aluminum chloride-rich stream is contacted with a sufficient quantity of a second solvent under appropriate conditions to substantially dissolve any ferric chloride which may be present. The second solvent also dissolves a quantity of aluminum chloride sufficient to saturate the solvent solution with aluminum chloride. The aluminum chloride in excess of that which is soluble in the second solvent is caused to separate as a solid phase. The aluminum chloride solids are separated from the solvent solution, washed with an additional quantity of the second solvent to remove any remaining impurities, if desired, and then recovered as a substantially pure aluminum chloride product. Advantageously, the first and second solvent are the same.

The second stream having the lower concentration of aluminum chloride is recycled to the beginning of the process where it is treated along with fresh chlorination product feed to dissolve its aluminum chloride content and leave in suspension the excess ferric chloride.

The cyclic nature of the process permits the production of a substantially pure aluminum chloride product so long as some displacement from the solubility ratio of the aluminum chloride and ferric chloride in the solvent is achieved when the molten aluminum chloride mixture is separated into the aluminum chloride-rich stream and the second stream.

DESCRIPTION OF THE DRAWING

The single FIGURE schematically illustrates the process of the present invention.

DESCRIPTION OF THE PREFERRED EMBODIMENT

Turning now to the drawing, an aluminous ore feed is introduced into a chlorination zone 12 through a conduit 10. For the purpose of illustrating the present invention, and not by way of limitation, the aluminous ore hereinafter will be described as containing alumina, ferric iron, titanium and silicon. Chlorine gas is introduced into zone 12 through a conduit 14. The ore feed is chlorinated in zone 12 to produce chlorination products comprising aluminum chloride, ferric chloride, titanium tetrachloride, silicon tetrachloride and the like.

Numerous methods to effect the chlorination of the ore are known by those skilled in the art. In one embodiment, zone 12 comprises a fluidized bed chlorinator which is operated at a temperature of from about 900 degrees C. to about 1000 degrees C. and at a pressure of from about atmospheric to about 15 psig to effect the chlorination. The chlorination products are withdrawn from chlorination zone 12 through a conduit 13 and introduced into a condenser 15.

In condenser 15, the chlorination products are condensed to form a slurry which then is introduced into a first separation zone 18 through a conduit 16. If the composition of the chlorination products is such that the condensed products are not readily flowable through conduit 16, a diluent is introduced into conduit 16 through a conduit 17. The diluent is added in sufficient quantity to provide a flowable slurry. The diluent can comprise any substance which is inert with respect to the chlorination products. Preferably, the diluent comprises a part of the chlorination products which has been recovered in the process and recycled, such as, for example, titanium tetrachloride or the like.

In the first separation zone 18, the aluminum chloride is separated from a number of the volatile impurities that are present. In one embodiment separation zone 18 comprises a distillation vessel. The distillation vessel is operated under suitable conditions to separate any impurities having a boiling point temperature below that of, for example, titanium tetrachloride. The distillation vessel generally is operated at a temperature in the range of from about 50 degrees C. to about 150 degrees C. and at a pressure in the range of from about 1 atmosphere to about 2 atmospheres. The impurities are withdrawn from the distillation vessel through a conduit 20. The principal impurity removed generally is silicon tetrachloride. The bottoms product remaining in the distillation vessel is withdrawn through a conduit 22 and introduced into a first mixing zone 24. The bottoms product is a slurry mixture comprising aluminum chloride, ferric chloride and titanium tetrachloride.

In first mixing zone 24, the bottoms product is contacted with a first solvent capable of preferentially dissolving at least a portion of the aluminum chloride in the mixture to form a solution. The solution also normally will include some dissolved ferric chloride. The ferric chloride in excess of that which is soluble in the first solvent and any other insoluble matter contained in the chlorination products remain in suspension in the solvent solution. The solution, including the suspended solids, then is withdrawn and introduced into a second separation zone 30 through a conduit 28.

The first solvent in which the aluminum chloride is selectively dissolved should be one which is effective for the intended purpose as well as economically attractive. Thus, the first solvent should exhibit the following properties: it should have chemical and thermal stability and a volatility which differs sufficiently from that of the aluminum chloride, ferric chloride and other principal chlorination products such that the products are readily separable from the solvent; and the aluminum chloride must be at least partially soluble in the solvent. The first solvent can be an organic salt or fused salt, such as, for example, $TiCl_4$, $SiCl_4$, $SnCl$, $VCl_4$ and the like. The solvent also can be a high boiling organic solvent and preferably a halogenated hydrocarbon or a derivative thereof, such as, for example, $CCl_4$, perchloroethylene and the like. The examples are illustrative of the solvents that are effective in the process of the present invention, but are in no way meant to limit the solvents that can be employed. A preferred solvent will have a melting point no greater than about 100 degrees C. and a boiling point no greater than about 170 degrees C. An especially preferred solvent for the particular embodiment of the invention presently illustrated is either titanium tetrachloride or silicon tetrachloride since both are readily available by-products of the aluminous ore chlorination process. Most preferably, the solvent is titanium tetrachloride which is maintained at a temperature in the range of from about 150 degress C. to about 190 degrees C. to increase the solubility of the aluminum chloride in the solvent.

In second separation zone 30, the fluid portion of the feed to the separation zone is separated from the undissolved materials to form a substantially solids-free stream. In one embodiment, zone 30 comprises a hydrocyclone. The pressure level within the separation zone is controlled to maintain the substantially solids-free stream in a liquid condition. The substantially solids-free stream is withdrawn from the hydrocyclone and passed through a conduit 32 for introduction into a third separation zone 36.

The undissolved solids are withdrawn from the hydrocyclone through a conduit 34. The separated solids can be treated by various known methods to minimize solvent and chlorine losses.

In an alternate embodiment, the second separation zone 30 can comprise, for example, a gravity settler, centrifuge or the like.

In the third separation zone 36, the first solvent is separated from the dissolved chlorides to produce a molten mixture of aluminum chloride and ferric chloride. In one embodiment, zone 36 comprises a distillation vessel. The solution is heated within the distillation vessel to separate the first solvent which then is removed through a conduit 38. The distillation vessel may be maintained at any temperature and pressure above the triple point (the temperature and pressure at which the mixture can exist as a solid, liquid and vapor) and below the critical temperature and pressure of the mixture. If TiCl$_4$ is the solvent, the pressure generally is maintained in the range of from about 2 to about 6 atmospheres. If a more volatile solvent is used, the pressure, of course, will be higher. The remainder of the mixture, comprising molten aluminum chloride and ferric chloride, then is introduced into a fourth separation zone 39 through a conduit 37. The aluminum chloride and ferric chloride are present in the molten mixture in a ratio essentially in proportion to their respective solubilities in the solvent.

In the fourth separation zone 39, the molten mixture is treated to produce an aluminum chloride-rich stream in which the ratio of aluminum chloride to ferric chloride is higher than the ratio present in the solvent solution and a second stream in which the ratio is lower. In one embodiment of the invention separation zone 39 comprises a distillation vessel. The temperature and pressure within the distillation vessel are maintained so as to provide a liquid-vapor interface within the vessel, thus providing an overhead fraction comprising an aluminum chloride-rich mixture and a bottoms fraction comprising a ferric chloride-rich slurry mixture. The distillation vessel may be maintained at any temperature and pressure above the triple point and below the critical temperature and pressure of the mixture. The pressure generally is maintained in the range of from about 2 to about 6 atmospheres and preferably is from about 3 to about 5 atmospheres.

The operating conditions in the distillation vessel are maintained so as to continuously produce a substantially pure aluminum chloride-rich vapor. It will be appreciated by those skilled in the art that the specific temperature and pressure conditions selected to provide the liquid-vapor interface may vary considerably to compensate for the presence of different impurities. The overhead is withdrawn from the distillation vessel of separation zone 39 through a conduit 40 and introduced into a condenser 42. Advantageously, the distillation vessel can include an overhead recycle to effect reflux within the distillation vessel. While reflux improves the quality of the overhead distillation product, the nature of the aluminum chloride and ferric chloride limits the purity of the product to a level below that which is desirable for a feed material to an electrolytic aluminum recovery process. While the specific cause is unknown, it is belived that the aluminum chloride can not be cleanly separated from the ferric chloride by distillation, at least in part, because the aluminum chloride forms a dimer molecule with ferric chloride which then distills under the same conditions as the aluminum chloride.

In condenser 42, the vaporized aluminum chloride-rich overhead stream is condensed to form a molten stream. The molten stream is withdrawn from condenser 42 through a conduit 44 and introduced into a second mixing zone 46.

While in one embodiment the third separation zone 36 and fourth separation zone 39 have been specifically described as two coacting distillation vessels which produce a vaporous aluminum chloride-rich overhead and a bottoms stream, it is to be understood that any other separation process which yields an aluminum chloride-rich stream and a second stream containing a lesser quantity of aluminum chloride may be employed. For example, numerous processes are known for producing an aluminum chloride-rich stream from a mixture by the addition of selective compounds which cause either the aluminum chloride or the impurities in the mixture to separate by a method referred to as "salting-out".

In second mixing zone 46, the molten aluminum chloride-rich stream is contacted and admixed with a second solvent. The second solvent is introduced into mixing zone 46 through a conduit 48. The second solvent may be the same as or different from the first solvent introduced into first mixing zone 24. The second solvent should have characteristics similar to those of the first solvent and preferably is the same as the first solvent. The second solvent preferably is maintained at a temperature below the temperature of the molten aluminum chloride-rich stream. Preferably, when the solvent is titanium tetrachloride, the temperature is maintained in the range of from about 150 degrees C. to about 190 degrees C. The second solvent dissolves at least a portion of and preferably all of the ferric chloride present in the aluminum chloride-rich stream. Normally, a portion of the aluminum chloride will dissolve along with the ferric chloride. The remainder of the molten aluminum chloride solidifies as separate particles in the solvent solution to form a slurry. The slurry is withdrawn from the second mixing zone 46 through a conduit 50 and introduced into a fifth separation zone 52.

In one embodiment, separation zone 52 comprises a series of two or more hydrocyclones. The slurry separates within the first hydrocyclone to provide an overhead stream comprising second solvent containing dissolved ferric chloride and an underflow of solidified aluminum chloride and some second solvent. The underflow is withdrawn from the first hydrocyclone, preferably admixed with an additional quantity of second solvent and then introduced into another hydrocyclone. The second solvent is introduced into the second hydrocyclone in separation zone 52 through a conduit 54. The additional second solvent effects a washing of the aluminum chloride precipitate to dissolve and remove any residual ferric chloride or other impurities that may be present. The slurry separates in the second hydrocyclone to provide an overhead stream of second solvent containing some dissolved aluminum chloride and at least a portion of any soluble impurities present.

The separated second solvent is withdrawn from separation zone 52 through a conduit 56 and can be recycled through a conduit 57 to first mixing zone 24. This permits a subsequent recovery of the aluminum chloride which was dissolved in the second solvent to effect impurity removal. The second solvent then can be recovered in the third separation zone 36 along with the first solvent. The underflow comprising substantially pure aluminum chloride and some solvent is withdrawn from the second hydrocyclone in separation zone 52 through a conduit 58. The underflow then is introduced into a sixth separation zone 60.

In an alternate embodiment, separation zone 52 can comprise a gravity settler, centrifuge or the like. Regardless of the particular apparatus employed, separation zone 52 is operated under sufficient pressure to maintain the second solvent in a fluid condition.

While the separation zone 52 has been described as comprising two or more vessels so as to permit a washing of the aluminum chloride solids, it is to be understood that such washing is not required, but merely improves the quality of the final product.

In separation zone 60, the aluminum chloride solids are separated from the second solvent by, for example, distillation. The second solvent separates completely due to a difference in the volatility of the second solvent and aluminum chloride. The separated second solvent is withdrawn from separation zone 60 through a conduit 62. Advantageously, the second solvent in conduit 62 is recycled in the process for use in, for example, mixing zone 46 or the like. The substantially pure aluminum chloride is withdrawn from separation zone 60 through a conduit 64 and recovered.

The bottoms from separation zone 36, comprising a molten ferric chloride-rich stream, are withdrawn through a conduit 41 and recycled to the first mixing zone 24. The recycle permits the recovery of at least a portion of any aluminum chloride that was present in the bottoms stream.

To further illustrate the process of the present invention, and not by way of limitation, the following example is provided. All parts and percentages referred to are by weight unless otherwise indicated.

EXAMPLE

A mixture of coke and bauxite is chlorinated, the metal chlorides are condensed and then diluted with $TiCl_4$ to produce a slurry comprising 25% $AlCl_3$, 5% $FeCl_3$, 66% $TiCl_4$, 3% $SiCl_4$ and less than 1% other condensable products. The slurry then is introduced into first separation zone 18 through conduit 16. Separation zone 18 comprises a distillation vessel maintained at a temperature of about 56 degrees C. at the top and at essentially atmospheric pressure. The $SiCl_4$ and other more volatile constituents are removed during the distillation. The bottoms comprising $AlCl_3$, $FeCl_3$ and $TiCl_4$ are withdrawn as a slurry through conduit 22 and introduced into mixing zone 24.

In mixing zone 24, the slurry is admixed with a first solvent comprising $TiCl_4$ to dissolve a substantial portion of the aluminum chloride and then introduced into second separation zone 30. The second separation zone is maintained at a temperature of about 170 degrees C. and a pressure of about 18 psig.

The undissolved solids settle within separation zone 30 and a substantially solids free overflow is withdrawn and introduced into third separation zone 36. The solution introduced into separation zone 36 comprises 10% $AlCl_3$, 1% $FeCl_3$ and 89% $TiCl_4$.

In separation zone 36 the $TiCl_4$ is removed by distillation and the remainder is separated into a $AlCl_3$ rich overhead and an $AlCl_3$-lean bottoms. The $AlCl_3$-rich overhead, comprising 95% $AlCl_3$ and 5% $FeCl_3$ is withdrawn from separation zone 36, condensed in condenser 42 and introduced into second mixing zone 46 at a temperature of about 200 degrees C. In mixing zone 46, the $AlCl_3$-rich overhead is admixed with a quantity of a second solvent comprising $TiCl_4$ sufficient to dissolve all of the $FeCl_3$ in the overhead. The $TiCl_4$ is introduced at a temperature of about 170 degrees C. The $TiCl_4$ quenches the $AlCl_3$-rich overhead while dissolving the $FeCl_3$ and some of the $AlCl_3$. The quenching causes the $AlCl_3$ in excess of that which is soluble in the $TiCl_4$ to solidify as particulate solids. The slurry then is introduced into the fourth separation zone 52 comprising a hydrocyclone wherein the slurry is maintained at a pressure of about 18 psig. to maintain the $TiCl_4$ solution as a liquid. The solids are separated as a bottoms fraction along with a small quantity of $TiCl_4$ solution and then introduced into a fifth separation zone 60.

In the fifth separation zone 60, the remaining $TiCl_4$ is removed by distillation to yield a substantially pure $AlCl_3$ product. The distillation is effected at a temperature of about 225 degrees C. and at a pressure of about 75 psig. A chemical analysis of the aluminum chloride indicates a purity in excess of 99.9 percent.

The example clearly demonstrates the ability of the process of the present invention to produce substantially pure aluminum chloride.

In an alternate embodiment of the invention, the aluminous ore is treated prior to chlorination to reduce the quantity of impurities, primarily iron oxides, that are contained in the ore. Such treatment reduces the small consumption of chlorine in the chlorination zone 12. To effect the treatment, the ore is ground and introduced into a leaching vessel. A dilute mineral acid, preferably 3 to 21% hydrochloric acid then is admixed with the ore. The mineral acid is introduced in sufficient quantity to dissolve at least a portion of the acid soluble impurities. The concentration of the acid and leaching conditions are controlled such that the alumina in the ore remains substantially undissolved. The leaching can be effected at ambient temperature or above. If elevated temperatures are employed, the leaching must be effected at a sufficiently elevated pressure to avoid boiling off of the acid. Preferably, the leaching is effected at ambient temperature and atmospheric pressure. Normally, a substantial portion of the impurities can be removed in from 6 to 18 hours. The leach liquor then is separated from the ore. The beneficiated aluminous ore is dried and then introduced into the chlorination zone 12 through conduit 10.

While the present invention has been described with respect to what at present are preferred embodiments thereof, it will be understood, of course, that certain changes, substitutions, modifications and the like may be made therein without departing from its true scope as defined in the appended claims.

What is claimed is:

1. A process for producing substantially pure aluminum chloride comprising:
   providing chlorination products of an aluminous ore containing iron and other impurities;
   contacting said chlorination products with a first solvent to dissolve at least a portion of the chlorides present including at least a portion of the aluminum chloride present in said chlorination products to form a solution;
   separating said solution from said undissolved chlorination products said solution containing aluminum chloride and at least one chloride of iron in a ratio essentially in proportion to their respective solubilities in the solvent;
   separating said first solvent from said solution to leave a mixture of molten chlorides;
   separating said mixture of molten chlorides into an aluminum chloride-rich stream and a second stream, said aluminum chloride-rich stream containing aluminum chloride in a ratio to any chloride of iron present in excess of the solubility ratio of the mixture of chlorides in a second solvent;
   contacting said molten aluminum chloride-rich stream with the second solvent to dissolve aluminum chloride and at least a portion of the chlorides other than aluminum chloride contained in said molten aluminum chloride-rich stream and saturate the solvent with aluminum chloride to form a second solution said second solution being in admixture with aluminum chloride in excess of that which is soluble as a solid phase; and;
   recovering said solid aluminum chloride from said second solution, said solid aluminum chloride being substantially pure aluminum chloride.

2. The process of claim 1 wherein the first solvent is the same as the second solvent.

3. The process of claim 1 wherein the first solvent is at least one member selected from the group consisting of titanium tetrachloride, silicon tetrachloride and carbon tetrachloride.

4. The process of claim 1 wherein the second solvent is at least one member selected from the group consisting of titanium tetrachloride and silicon tetrachloride.

5. The process of claim 1 wherein separating said first solvent from said dissolved chlorides is defined further as separating said first solvent by distillation.

6. The process of claim 1 wherein providing chlorination products of an aluminous ore is defined further as:
   contacting an aluminous ore prior to chlorination with a mineral acid present in sufficient quantity to dissolve at least a portion of any acid soluble impurities that are present and form a solution of said dissolved impurities, said mineral acid having a concentration such that alumina in said aluminous ore remains substantially undissolved;
   separating said solution from the remaining aluminous ore to form a pretreated aluminous ore; and
   chlorinating said pretreated aluminous ore to form chlorination products.

* * * * *